United States Patent
Reese et al.

[11] 3,803,917
[45] Apr. 16, 1974

[54] DIFFERENTIAL PRESSURE SENSOR

[75] Inventors: Dennis L. Reese, Kirkland; William Jenkins, Seattle, both of Wash.

[73] Assignee: Western Liquid Level, Inc.

[22] Filed: Jan. 15, 1973

[21] Appl. No.: 323,866

[52] U.S. Cl. .................. 73/393, 73/300, 73/388 B, 73/388 N
[51] Int. Cl. ............................................ G01l 7/08
[58] Field of Search...... 73/302, 388 B, 388 N, 407, 73/393, 299, 300, 301

[56] References Cited
UNITED STATES PATENTS
2,312,201  2/1943  Thompson et al.............. 73/388 BN

*Primary Examiner*—Donald O. Woodiel

[57] ABSTRACT

The differential pressure sensor utilizes a source of pneumatic pressure constituting a sensing pressure, which acts against a first or "sensing diaphragm." The sensed fluid pressure is applied against a second diaphragm which acts, through a pressure transducer, in opposition to the pressure applied to the sensing diaphragm, tending to close a valve in the sensing pressure line causing a build-up of sensing pressure until the two pressures are balanced and a constant flow of sensing fluid is restored. A remote read-out in the sensing pressure line may be calibrated in terms of lquid level or sensed pressure level so as to indicate changes in the sensed pressure. In order to compensate for vapor pressure or "overpressure" in situations where the unknown pressure is that resulting from the liquid level in a closed tank, the vapor pressure in the tank is applied to a compensating diaphragm acting against the pressure transducer in opposition to the sensed pressure diaphragm. The compensating diaphragm is sized so as to compensate for the vapor pressure to which both the sensed pressure diaphragm and the sensing pressure diaphragm are subjected. A first screw adjustment means is provided to adjust the sensitivity of the restricting valve in the sensing pressure line and a second adjustment means is provided for regulating the effective diaphragm area exposed directly to the vapor pressure.

9 Claims, 2 Drawing Figures

DIFFERENTIAL PRESSURE SENSOR

BACKGROUND OF THE INVENTION

The present invention relates to differential pressure sensors and, more particularly, to those designed for sensing the liquid level in a closed tank or container. A typical application would be for liquid marine cargo tanks or general purpose liquid storage tanks. Pressure sensors of this type have been designed to utilize essentially a two diaphragm system for sensing very low magnitude pressure changes. The sensed pressure is applied against a relatively large diaphragm which is balanced by the force of a source of sensing pressure action against a smaller diaphragm, thereby obtaining a magnified reading. An unbalanced condition between the forces of these two diaphragms will result in the closing of a valve restricting the flow in the sensing pressure line causing an increase in the sensing pressure. The increased sensing pressure may be utilized to either activitate a fluid level control system or an alarm system. The sensing pressure line may also be equipped with a constant flow meter designed to raise the sensing pressure to maintain a constant flow of sensing fluid so as to rebalance the system and the increased value of the sensed pressure or the liquid level may be read on an indicator in the sensing pressure line. In known designs of this type of apparatus, the sensing pressure diaphragm and the sensed pressure diaphragm are necessarily mechanically linked by a pressure transducer for direct response. In the prior art, liquid level sensors of this type have been subject to error caused by vapor pressure or "overpressure" above the liquid to which the sensor is subjected in a closed tank. Thus, the reading obtained included the vapor pressure factor, which is influenced by such vairable conditions as temperature and the level of the liquid in the tank itself. Efforts to expose the opposite side of the sensed pressure diaphgram to the vapor pressure in order to cancel the vapor pressure resulted also in subjecting the opposite side of the sensing pressure diaphragm to the same vapor pressure. The compensation was thus not complete and accurate.

The present invention provides a novel structural arrangement wherein additional compensating diaphgram means is introduced into the apparatus and is directly subjected to the vapor or "overpressure" from the tank acting in a direction opposed to the forces exerted against the sensed pressure diaphragm. The compensating diaphragm is sized such that its effective area cancels out all effect of the vapor pressure acting against the sensing diaphragm. The present invention also provides novel means for controlling the sensitivity of the balanced valve in the sensing pressure line and for controlling the effective diaphragm area acted upon by the vapor pressure in order to adjust for manufacturing tolerances and to obtain complete accuracy.

The primary object of the present invention is, therefore, to provide a differential pressure sensor for liquid level sensing with means for accurately and completely compensating for vapor pressure in the liquid tank.

A more particular object of the invention is to provide a differential pressure sensor of the character described which provides an additional compensating diaphgram to completely eliminate the effect of vapor pressure in the liquid tank.

Another object of the present invention is to provide adjusting means for adjusting the sensitivity of the balancing valve in the sensing pressure line which is accessible externally of the unit.

A still further object of the present invention is to provide a differential pressure sensor of the character described which includes adjusting means for varying the effective diaphgram area exposed directly to the vapor pressure in order to obtain complete accuracy in the system.

DETAILED DESCRIPTION OF THE PREFERRED EMBODIMENT

Figure 1:
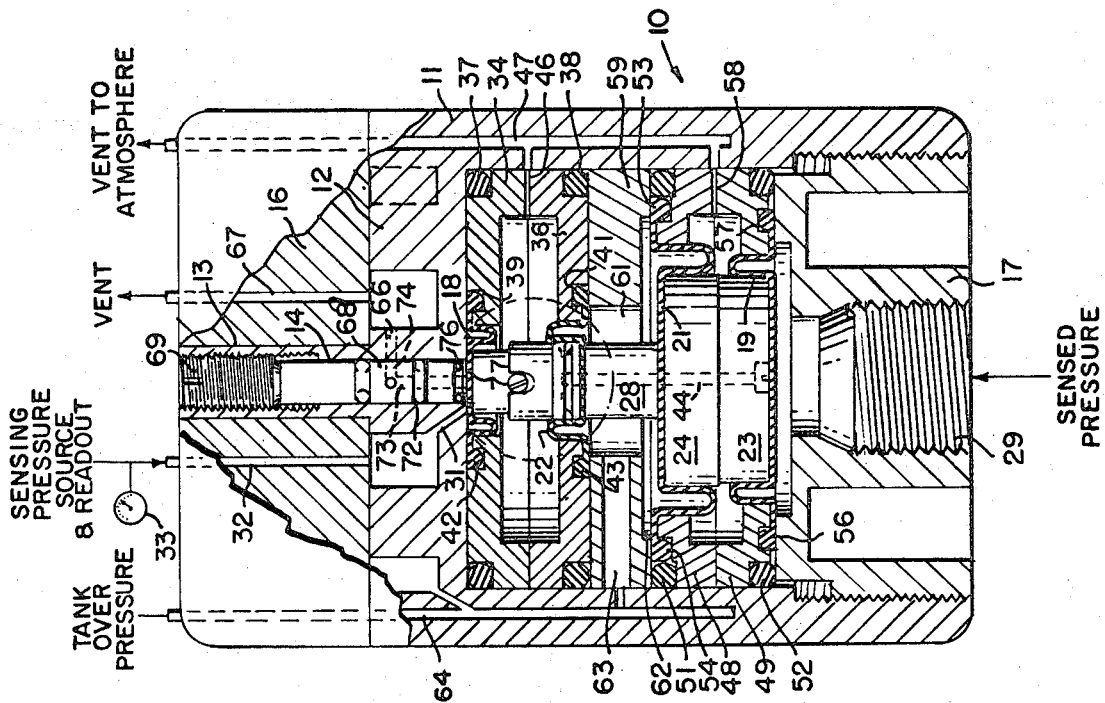
FIG. 1 is a cross-sectional view of the liquid level sensor.

As illustrated in FIG. 1, the differential pressure sensor comprises a housing assembly 10 which may be a hollow, cylindrical, molded structure of plastic or any other suitable material capable of being so formed. The housing assembly includes the cylindrical wall 11 and an end closure 12 with the cylindrical wall extending a short distance beyond the end closure 12 and being coterminous with a centrally located tubular extension 13. The wall 11, closure 12, and tubular extension 13 may all be of one integrally molded structure. It will be understood, of course, that such details of construction may be varied without departing from the spirit and scope of the invention. The tubular extension 13 is provided with an internal passage 14 which extends through the tubular member and through the end closure 12 into the body of the housing. The area between the tubular extension 13 and the extended cylindrical wall 11 may be potted with a suitable plastic material 16 with provisions being made for certain fluid passages presently to be described. The opposite end of the housing 10 is fitted with a screw-threaded, adjustable plug member 17 which confines the pressure diaphragm assembly within the housing, also presently to be described in detail.

The diaphragm assembly includes a sensing pressure diaphragm 18, a sensed pressure diaphragm 19, a vapor pressure compensating diaphragm 21, and a fourth diaphragm 22 which is subjected to the vapor pressure and exerts a force in the opposite direction from the force exerted by the diaphragm 21. The diaphragm 22 is subject to the pressure which would normally be applied to the back side of the sensing diaphragm 18. All of these diaphragms are connected by the pistons 23, 24, 26 and the connector 28 which comprise the pressure transducer positively connecting the sensing pressure diaphragm 18 and the sensed pressure diaphragm 19.

As previously described, the entire housing assembly is designed to be immersed in a liquid with the pressure of the surrounding liquid being applied to the sensed pressure diaphragm 19 through an enlarged opening 29 in the plug 17. The sensing pressure diaphragm 18 is exposed to the constant source of sensing pressure through a passage 31 in the end closure 12 and the sensing pressure conduit 32 in the material 16. The pressure conduit 32 is connected to a sensing pressure source as indicated and is provided with a pressure gauge 33 calibrated to read in pounds of pressure or liquid level based on pressure changes which occur as a result of a change in the liquid level in the tank. The sensing pressure source may typically be a $CO_2$ bottle, manifolded $CO^2$ or compressed air.

Although not a part of the present invention, it will be understood that the system may be adapted for either a static or dynamic sensing operation. In the event that a dynamic sensing system is desired, the sensing pressure source will be equipped with a constant flow regulator which maintains a constant flow of fluid against the sensing pressure diaphragm 18 with pressure changes being indicated by the read-out device 33 as the sensing pressure is balanced against the sensed pressure acting on the diaphragm 19. In the event that a static system is desired, a constant pressure source may be applied to the diaphragm 18. The sensing pressure will be designed to balance the sensed pressure acting on the diaphragm 19, maintaining the diaphragm 18 against a valve seat and holding the system static until a drop in the liquid level occurs. A drop in the liquid level results in a drop in the sensed pressure resulting in an unbalanced pressure condition and the opening of the valve means causing a flow of fluid past the sensing diaphragm. The drop in the sensing pressure may be reflected by a read-out or indicator.

The diaphragm assembly comprises a series of dished disc members which are sealed relative to the cylinder wall 11 by appropriate O-ring seals. The mating discs 34 and 36, which are sealed by the O-rings 37 and 38, respectively, serve to retain the diaphragms 18 and 22 by means of the annular channels 39 and 41 therein which receive the annular ribs or welts 42 and 43 on the respective diaphragms. The diaphragm 18 contacts one end of the piston 26 and the diaphragm 22 is clamped between the other end of the piston and the connector 28 by means of the connector bolt 44. The discs are clamped against the end closure 12 by the plug 17. The space between the dished discs is isolated from the sensing and the sensed pressure fluids and may be vented to atmosphere through the passages 46 and 47, as illustrated.

The mating discs 48 and 49 are sealed by the O-rings 51 and 52, respectively, and serve to retain the diaphragms 19 and 21, respectively. The diaphragm 21 is provided with an annular welt 53 engaged in the channel 54 and the diaphragm 19 is provided with an annular welt 56 located in the channel 57. The pistons 23 and 24 are located between the two diaphragms and secured in place by the connector bolt 44 which serves also to clamp these pistons to the piston 26 and connector 28. The space between the dished discs 48 and 49 is thus sealed from the sensed and the sensing fluids and may be vented to atmosphere by means of the passage 58 which connects with the vent passage 47.

Located between the two sets of mating discs is a fifth disc structure 59 which has an enlarged central through opening 61 surrounding the connector member 28 and communicating with the diaphragms 21 and 22. The bottom side of the disc 59 has an enlarged diameter, recessed area 62 permitting complete access to the exposed surface area of the diaphragm 21. The through opening 61 is provided with a passage 63 which connects the central portion of the disc with the tank overpressure conduit 64, thus exposing both diaphragms 21 and 22 to the vapor pressure or tank overpressure.

To provide a valve means between the sensing pressure conduit 31 and vent passages 66 and 67, the passage 14 is fitted with a core member 68. The upper end of the core 68 is threadably engaged with the passage 14 as indicated at 69. With this arrangement, the position of the core within the passage may be adjusted for controlling the sensitivity of the valve means as will be described. The core is fluid sealed relative to the passage 14 by means of O-rings 71 and 72.

The lower end of the core 68 has a vertical bore 73 and a lateral bore 74 which communicates with the vent passage 66. The bottom end of the core 68 has a shoulder designed to seat an O-ring valve member 76 which mates with a valve seat 77 attached to the top side of the sensing pressure diaphragm 18. Thus it will be seen that, movement of the seat 77 toward and away from the O-ring seat 76, as a result of variation in the sensed pressure acting against diaphragm 9, results in the opening and closing of the valve or restricting of the passage of sensing fluid from the passage 31 to the passage 73.

Figure 2:
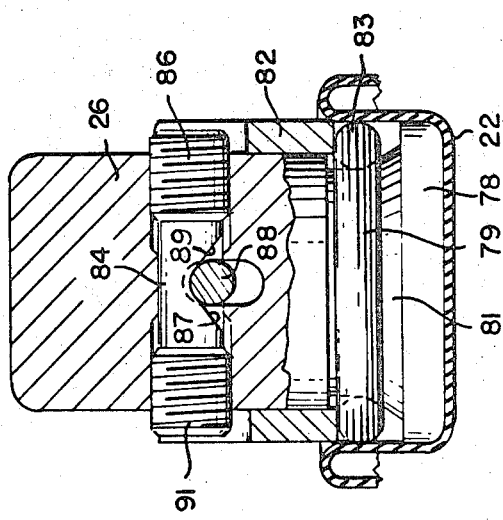
FIG. 2 is a cross-sectional view of the effective diaphragm area adjusting means for the device.

Referring now to FIG. 2, the mechanism for adjusting the affective area of the diaphragm 22 is shown in detail. The piston 26 is constructed so as to include a cylindrical body with an enlarged diameter head 78 against which the diaphragm 22 bears. The portion of the piston between the head 78 and the main body includes a reduced diameter cylindrical section 79 and a conical section 81. A sleeve 82 is slidably located about the lower end of the piston 26 and bears against the O-ring 83 which seats on the tapered surface of the conical section 81. The position of the sleeve 82 is adjustably controlled by the cam member 84 mounted within a threaded cross bore in the piston 26. The cam member has oppositely inclined surfaces 87 and 89 which contact the cross pin 88 fixed to the sleeve 82. The transverse position of the cam member is controlled by the screw threaded end elements 86 and 91. These elements may be made accessible through appropriate slots in the sleeve 82 as shown and may be made accessible by through appropriate openings in the cylinder wall (not shown). When the cam member is moved right or left from the center position shown, the sleeve is forced downwardly moving the O-ring 83 along the inclined surface of the conical section 81. The O-ring 83 in turn acts against the backside of the diaphragm 22 to adjust the effective area thereof which is exposed to the tank overpressure. The adjustment provided by the cam member 84 is sufficient to compensate for manufacturing tolerances as will be presently described.

The entire structure described may be constructed from non-metallic components with the housing assembly being of molded plastic, the diaphragms being of neoprene or the like and the O-rings being of rubber or its equivalent. As previously described, the sensing pressure acts against the diaphragm 18 and the sensed pressure acts against the diaphragm 19. These two pressures are balanced and the read-out means 33 may be calibrated to read in terms of pressure or liquid level. In order to completely eliminate the effects of tank overpressure acting on diaphragm 19, the overpressure is applied directly to the compensating diaphragm 21 and the diaphragm 22. The overpressure is applied to the diaphragm 22 instead of the backside of the sensing diaphragm 18 in order that the effective area adjusting means shown in FIG. 2 and thus the system may be set to obtain absolute accuracy for varying conditions.

It will be understood by those skilled in the art that the present invention provides novel, useful and unobvious emprovements over prior art pressure sensors of the character described. Changes in the details of construction may be resorted to without departing from the spirit of the invention and it is accordingly intended that no limitations be implied and that the hereto annexed claims be given the broadest interpretation to which the employed language fairly admits.

The embodiments of the invention in which an exclusive property or privilege is claimed are defined as follows:

1. In a differential pressure sensor for sensing the pressure of a liquid in a closed tank, said pressure sensor having a sensing pressure chamber with a wall and sensing pressure diaphragm means adjacent thereto adapted to reciprocate with respect to the wall, a sensing fluid-flow passage in the wall having a first restricting valve element located in said wall, a second mating valve element connected to said sensing pressure diaphragm and adapted to contact the first valve element to throttle the flow of sensing fluid in the passage in so doing, an external source of sensing fluid pressure connected to said passage, pressure read-out means operative to determine the pressure of the sensing fluid in said passage, a sensed pressure diaphragm exposed to liquid pressure in the tank and pressure transducer means connecting the sensed pressure diaphragm and the sensing pressure diaphragm, a vapor pressure compensation means comprising in combination;

a vapor pressure compensating diaphragm connected to said pressure transducer, means to apply the vapor pressure against said compensating diaphragm in a direction opposed to the force applied by the sensed pressure diaphragm, a second diaphragm connected to said pressure transducer, means to apply the vapor pressure against said second diaphragm in a direction parallel to the force applied by the sensed pressure diaphragm, said vapor pressure compensating diaphragm having an effective area equal to the combined effective areas of the sensed pressure and said second diaphragm.

2. The combination according to claim 1 including means connected to said second diaphragm for adjusting the effective area thereof exposed to the vapor pressure.

3. The combination according to claim 2 including means in said wall connected to said first restricting valve element for selectively adjusting the position of the first valve element relative to the second valve element whereby the sensitivity of the throttling effect of the valve can be adjusted.

4. The combination according to claim 1 including means in said wall connected to said first restricting valve element for selectively adjusting the position of the first valve element relative to the second valve element whereby the sensitivity of the throttling effect of the valve can be adjusted.

5. In a differential pressure sensor for sensing the pressure of a liquid in a closed tank, said pressure sensor having a sensing pressure chamber with a wall and sensing pressure diaphragm means adjacent thereto adapted to reciprocate with respect to the wall, a sensing fluid-flow passage in the wall having a first restricting valve element located in said wall, a second mating valve element connected to said sensing pressure diaphragm and adapted to contact the first valve element to throttle flow of sensing fluid in the passage in so doing, an external source of sensing fluid pressure connected to said passage, pressure read-out means operative to determine the pressure of the sensing fluid in said passage, a sensed pressure diaphragm exposed to liquid pressure in the tank and pressure transducer means connecting the sensed pressure diaphragm and the sensing pressure diaphragm, a vapor pressure compensation means comprising;

a vapor pressure chamber, the walls of said chamber including a vapor pressure compensating diaphragm and a second diaphragm spaced therefrom, vapor pressure passage means connecting said chamber to the vapor pressure in said tank, said vapor pressure compensating diaphragm being connected to apply the force of the vapor pressure exerted thereon to said pressure transducer in a direction opposite to the force applied by said sensed pressure diaphragm, said second diaphragm being connected to apply the force of the vapor pressure exerted thereon to said pressure transducer in a direction parallel to force applied by the sensed pressure diaphragm, said vapor pressure compensating diaphragm having an effective area equal to the combined effective areas of the sensed pressure diaphragm and said second diaphragm whereby the effect of the vapor pressure on the sensing diaphragm is cancelled.

6. The combination according to claim 5 including means connected to said second diaphragm for adjusting the effective area thereof exposed to the vapor pressure.

7. The combination according to claim 6 wherein said pressure transducer means extends through said vapor pressure chamber and is positively connected to the center portions of said compensating diaphragm and said second diaphragm, said second diaphragm having a portion of its surface extending about the circumference of the pressure transducer and parallel to the longitudinal axis thereof, said means for adjusting the effective area of the second diaphragm comprising, means located on the opposite side of the second diaphragm from the vapor pressure chamber to selectively expand said diaphragm away from contact with the circumference of the pressure transducer.

8. The combination according to claim 6 including means in said wall connected to said first restricting valve element for selectively adjusting the position of the first valve element relative to the second valve element whereby the sensitivity of throttling effect of the valve can be adjusted.

9. The combination according to claim 5 including means in said wall connected to said first restricting valve element for selectively adjusting the position of the first valve element relative to the second valve element whereby the sensitivity of throttling effect of the valve can be adjusted.

* * * * *